(12) United States Patent
Gootherts et al.

(10) Patent No.: US 7,681,199 B2
(45) Date of Patent: Mar. 16, 2010

(54) TIME MEASUREMENT USING A CONTEXT SWITCH COUNT, AN OFFSET, AND A SCALE FACTOR, RECEIVED FROM THE OPERATING SYSTEM

(75) Inventors: Paul Gootherts, Santa Clara, CA (US); Douglas V. Larson, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1595 days.

(21) Appl. No.: 10/931,107

(22) Filed: Aug. 31, 2004

(65) Prior Publication Data

US 2006/0048148 A1 Mar. 2, 2006

(51) Int. Cl.
- G06F 9/46 (2006.01)
- G06F 1/12 (2006.01)
- G06F 1/00 (2006.01)
- G06F 1/14 (2006.01)

(52) U.S. Cl. .................. 718/108; 718/100; 713/400; 713/500; 713/502; 713/600; 713/601

(58) Field of Classification Search .................. 718/1, 718/100, 101, 102, 103, 104, 105, 106, 107, 718/108; 713/400, 401, 500, 501, 502, 600, 713/601
See application file for complete search history.

(56) References Cited

U.S. PATENT DOCUMENTS

| | | | | |
|---|---|---|---|---|
| 5,416,808 A * | 5/1995 | Witsaman et al. ........... | 375/356 |
| 5,974,438 A * | 10/1999 | Neufeld ....................... | 718/104 |
| 6,047,122 A * | 4/2000 | Spiller ......................... | 718/108 |
| 6,195,676 B1 * | 2/2001 | Spix et al. ................... | 718/107 |
| 6,223,208 B1 * | 4/2001 | Kiefer et al. ................ | 718/108 |
| 6,267,501 B1 * | 7/2001 | Wand et al. ................. | 374/124 |
| 6,269,391 B1 * | 7/2001 | Gillespie .................... | 718/100 |
| 6,502,141 B1 * | 12/2002 | Rawson, III ............... | 713/375 |
| 6,658,447 B2 * | 12/2003 | Cota-Robles .............. | 718/103 |
| 6,717,978 B1 * | 4/2004 | Yang et al. .................. | 375/150 |
| 6,763,474 B1 * | 7/2004 | Boerstler et al. ........... | 713/400 |
| 6,826,175 B1 * | 11/2004 | Gammenthaler et al. .... | 370/352 |
| 6,862,683 B1 * | 3/2005 | Wille et al. ................. | 713/151 |
| 6,886,162 B1 * | 4/2005 | McKenney .................. | 718/102 |
| 6,952,825 B1 * | 10/2005 | Cockx et al. ................ | 718/102 |
| 6,968,473 B2 * | 11/2005 | Kriz et al. ................... | 713/500 |
| 7,149,925 B2 * | 12/2006 | Vath ............................ | 714/30 |
| 7,197,652 B2 * | 3/2007 | Keller et al. ................ | 713/320 |
| 7,493,621 B2 * | 2/2009 | Bradford et al. ........... | 718/108 |
| 2004/0156462 A1 * | 8/2004 | Fuehrer et al. .............. | 375/354 |
| 2005/0207453 A1 * | 9/2005 | Panvalkar et al. ........... | 370/509 |
| 2005/0276413 A1 * | 12/2005 | Neogi ......................... | 380/28 |

OTHER PUBLICATIONS

Intel P6 vs P7 system call performance; Indiana university Linux-Kernel Archive; Dec. 2002, 14 pages.*

* cited by examiner

Primary Examiner—Meng-Ai An
Assistant Examiner—Abdullah Al Kawsar

(57) ABSTRACT

Systems, methods, and devices are provided for time measurement. One embodiment includes a method for measuring time on multiprocessor systems. The method includes allocating a memory space to a thread to be used to communicate with an operating system and saving a context switch count, an offset, and a scale factor, received from the operating system, in the memory space.

15 Claims, 4 Drawing Sheets

TIME MEASUREMENT USING A CONTEXT SWITCH COUNT, AN OFFSET, AND A SCALE FACTOR, RECEIVED FROM THE OPERATING SYSTEM

BACKGROUND

A computing device, such as a server, router, desktop computer, laptop, etc., and other devices having processor logic and memory, includes an operating system layer and an application layer to enable the device to perform various functions or roles. The operating system layer includes a "kernel", i.e., master control program, that runs the computing device. The kernel provides task management, device management, and data management, among others. In other words, the kernel sets the standards for application programs that run on the computing device. The application layer includes programs, i.e., executable instructions, which are located above the operating system layer and accessible by a user. As used herein, "user" space, or "user-mode" implies a layer of code which is less privileged than the layer of code which is in the operating system layer or "kernel" space.

In an operating system, a process refers to a running program which has a state and may have an input and output. Each process has one or more threads. A thread is an executable set of instructions being executed on a processor. A thread is sometimes referred to as a lightweight process. For example, a process contains attributes shared by all executing threads in the in the process, such as an address space, file descriptors, variables of an executing instance of a program, etc. Processes and threads are well known in the art and are described, for example, in Modern Operating Systems, Andrew S. Tannenbaum, (1992).

Many applications, or processes may be running at the same time on a computing device. The kernel manages the set of processes such that each process is provided with processor cycles. The kernel provides a set of services, referred to as "system calls" to allow the processes to interact with the kernel. In a system call, the process calls a routine in the kernel (system) to undertake some specific task. For example, a system call referred to as "gettimeofday" is used in Unix systems to retrieve time.

Many application programs use time information, e.g., "time of day", and use it often. Some example uses include time-stamps for file modifications and database transactions. Taking the difference between times is often used to measure intervals. A slow time of day interface can become a performance limiter. The use of time information has become so frequent that many processors provide software with a hardware clock of some sort that can be read quickly. Such clocks may not indicate the date and time directly, but rather count at some known rate. Hardware counters provides an affordable solution and can be associated with computing device components, e.g., processors, rather easily.

When a process involves a time measurement, a user process calls, e.g., queries, into the operating system with a request for time. The operating system is then expected to do something with hardware to return time. For example, in one operating system environment, the operating system may retrieve an offset and a scale factor which can be applied to a count from a counter and convert the count to date and time. In this example, the offset is additive and accounts for when the counter started. The scale factor is multiplicative and accounts for a difference in rates between the counter and external standard clock rates, i.e. as measured by an office wall clock. The counter can be converted to wall clock time using the formula: Wall_time= (scale_factor*hardware_counter)+offset. The operating system query can be expensive in terms of lines of program coding and processor time used since the query is often implemented as a system call. This query, however, does not pose a system performance issue because the scale factor and offset do not change. As such a program will only have to call a routine for these values once.

However, in multiprocessor computer devices, the hardware usually provides a separate and independent counter for each processor. These counters possess all of the properties of the counter described above, except that they may not be synchronized. As a result the scale factor and offset discussed above may not be the same for each processor. For example, the processors may not all run at the same speed, each processor's counter may start with a different initial value, and/or both. In a multiprocessor environment, the executing threads of a process may be switched on and off of a processor and/or from one processor to another (referred to herein as "context switches") for efficient utilization of computing resources. When this occurs while the thread is gathering time information it is possible that the scale factor and offset being used by the thread will be inappropriate for the counter value used and/or the counter value will not be current.

DETAILED DESCRIPTION

Program embodiments are provided which execute instructions to perform a method for use in measuring time in a computing device and/or system. The program instructions execute to allocate a memory space to a thread to be used to communicate with an operating system. The memory space is in user memory space and its address is communicated to the operating system which records the address and uses it to send information to the thread. The program embodiments execute instructions to save a context switch count, an offset, and a scale factor, received from the operating system, in the memory space.

In various embodiments the program instructions execute to copy a context switch count, representing a thread state associated with a processor on which the thread is executing, from the memory space to a local variable. The program instructions execute to use a counter, a scale factor, and an offset associated with the processor to calculate time. Program embodiments further execute instructions to compare the context switch count copied to the local variable to the context switch count in the memory space. When the context switch count in the local variable does not equal the context switch count in the memory space, the program embodiments execute instructions to repeat the above described process. The operating system is responsible for updating the context switch count, the offset, and the scale factor in the memory space when a context switch has occurred.

Figure 1A:
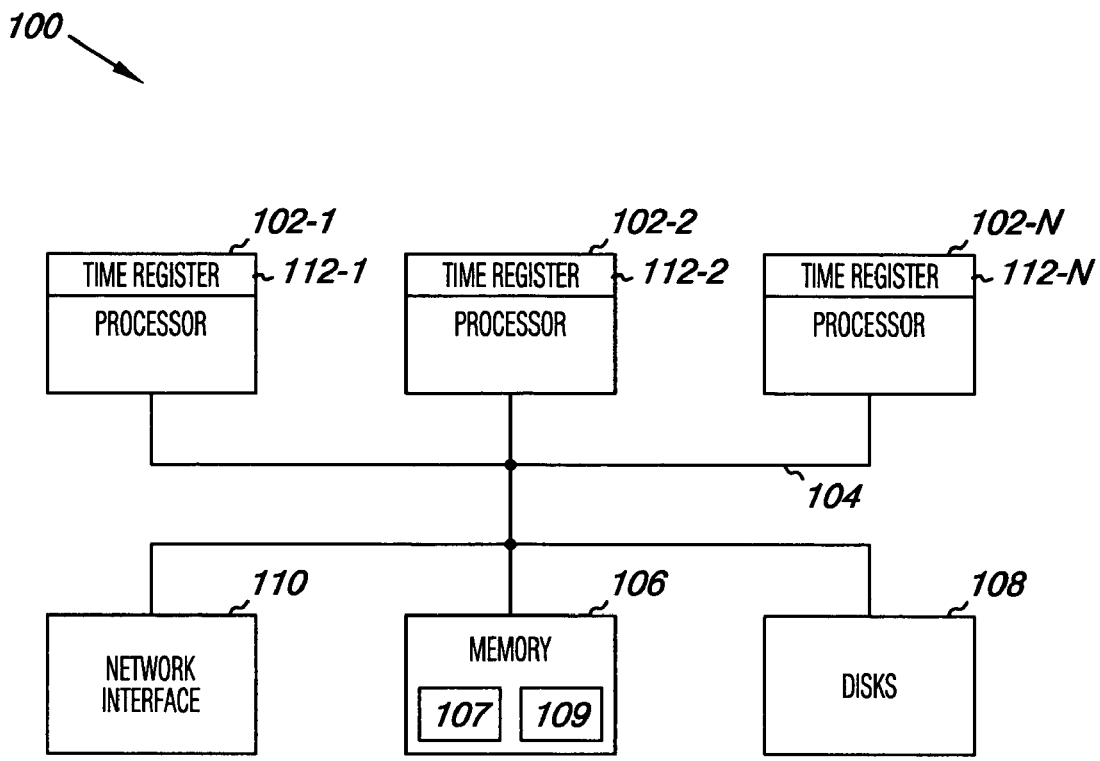
FIG. 1A is a block diagram illustration of a computing device and/or system suitable for time measurement embodiments of the present invention.

FIG. 1A is a block diagram illustration of a computing system 100 on which many application programs, or processes, can be running. The computing system 100 is one example suitable for implementing embodiments of the present invention for use in performing time measurements. The embodiment of FIG. 1A illustrates a multi-processor system 102-1, 102-2, ..., 102-N on which many threads can be executing. Various types of processors can be implemented as suited to carrying out the various embodiments of the present invention. Embodiments, however, are not limited to a particular number or type of processor(s) used. As shown in FIG. 1A, the number of processors 102-1, 102-2, ..., 102-N have connections to one another and other system components via a bus connection 104, as the same are known and understood by one of ordinary skill in the art. The number of processors 102-1, 102-2, ..., 102-N are coupled to memory 106 via bus 104. As one of ordinary skill in the art will appreciate, memory 106 includes operating system memory 107 and user space memory ("user memory") 109. One of ordinary skill in the art will appreciate the manner in which a process and each of its associated threads can request and be allocated memory space with a particular memory address, e.g., virtual memory address, assigned to the same. Memory 106 can include random access memory (RAM) and read only memory (ROM), etc. Memory 106 can store programming instructions and data associated with the operating system and associated with multiple threads in multiple processes. Memory 106 likewise can store basic operating instructions, program code, data and objects used, e.g., executed, by the number of processors to perform functions on the system 100.

FIG. 1A additionally illustrates number of processors 102-1, 102-2, ..., 102-N can be connected via bus 104, e.g., via a peripheral bus, to other subsystems and devices. These other subsystems and devices can include removable and fixed mass storage disks 108, network interfaces 110, auxiliary input/output (I/O) devices (not shown) such as microphones, speakers, touch sensitive displays, voice or handwriting recognizers, biometric readers, cameras, etc. Fixed mass storage 108 can include hard disk drives and removable mass storage can include non-volatile and volatile memory such as Flash memory, compact disks (CDs), floppy disks, portable memory keys, and other magnetic and/or optical memory mediums, etc. Embodiments are not limited to these examples. Network interfaces 110 can include internet connections as well as intranets, local area networks (LANs), enterprise networks, wide area networks (WANs), etc., whether wirelessly accessed or otherwise. Network interfaces 110 allow the number of processors 102-1, 102-2, ..., 102-N to be connected to other computers, e.g., laptops, workstations, desktops, servers, etc., and computer networks, or telecommunications network using various network connection types and associated protocols as one of ordinary skill in the art will appreciate upon reading this disclosure.

The number of processors 102-1, 102-2, ..., 102-N can receive information, e.g., data objects or program instructions, from other networks and can output information to these other networks in connection with performing embodiments discussed herein.

As noted above, a process and its associated threads will often request time, i.e., time of day, as part of a program application. Some systems provide a global, synchronized clock to fulfill such time requests. However, the existence or non-existence of a global, synchronized clock within a given computing device or system is not a decision a software developer is involved in. Instead software developers have to work with whatever hardware may be supplied in a given device or system. Additionally, a single global clock has the drawback of running at memory access speeds, with no cache, which can translate to hundreds of processor cycles. As noted a slow time of day interface can become a performance limiter.

More frequently, most processors, e.g., in a multiprocessor system, provide software (i.e., computer executable instructions) with a hardware clock or counter, e.g. hardware timer register of some sort, to attempt to read time quickly and more affordably. The hardware counter may not indicate the date and time directly, but rather count at some known rate. For example, when a process involves a time measurement, a user process calls, e.g., queries, into the operating system with a request for time. The operating system is then expected to do something with hardware to return time. For example, in one operating system environment, the operating system may retrieve an offset and a scale factor which can be applied to a count from a counter and convert the count to date and time. In this example, the offset is added to account for when the counter started and the scale factor is provided to account for a difference in rates between the counter and external standard clock rates. A formula, such as Wall_time= (scale_factor*hardware_counter)+offset, can be used to perform the conversion. The operating system query can be expensive in terms of lines of program coding and processor time used since the query is often implemented as a system call. This query does not pose a system performance issue because the scale factor and offset do not change for a particular counter, e.g., a hardware timer register associated with a processor. As such a program will only have to call a routine for these values once.

Figure 1B:
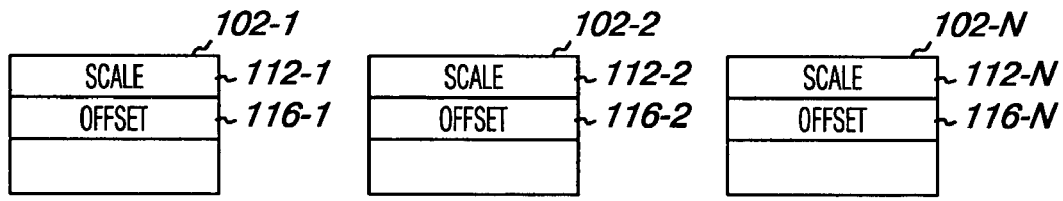
FIG. 1B is a block diagram illustration of per-processor data as can be included as data within a computing device's operating system.

In multiprocessor computer devices, separate and independent counter hardware may be provided for each processor. This is illustrated in FIG. 1A which shows each of the number of processors, 102-1, 102-2, ..., 102-N, having its own hardware counter, labeled "time register", 112-1, 112-2, ..., 112-N, respectively. Embodiments, however, are not limited to this example. Although the counters may possess all of the properties described above, they may not be synchronized, e.g., the processors may not all run at the same speed, each processor's counter may start with a different initial value, and/or both. As a result the scale factor and offset discussed above may not be the same for each processor. This is illustrated in FIG. 1B which shows each of the number of processors, 102-1, 102-2, ..., 102-N, having a scale value, 114-1, 114-2, ..., 114-N, and an offset, 116-1, 116-2, ..., 116-N, which may or may not be the same between processors. As one of ordinary skill in the art will appreciate, the scale value and offset (as part of per-processor data) can be stored as data within the operating system (i.e., operating system memory 107) of a device or system 100. A system call can be made to retrieve these values once for each processor and store this information in user memory 109 while the system 100 is running.

As noted above, a thread executing on a given processor, e.g., 102-1, 102-2, ..., 102-N, may be switched on and off of a processor and/or switched from one processor to another in a multiprocessor environment. This type of thread state change is referred to herein as a "context switch". Context switches may occur for various reasons including efficient utilization of computing resources. When this occurs while a thread is gathering time information it is possible that the scale factor and offset being used by the thread will be inappropriate for the processor counter value used and/or the processor counter value may not be current.

To overcome the above described issues, and as will be described in more detail below, embodiments of the present invention execute program instructions to allocate a memory space to a thread to be used to communicate with the operating system.

Figure 1C:
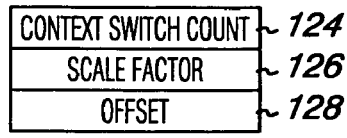
FIG. 1C is a block diagram illustration of an embodiment for the allocation of a memory space to a thread to be used as a communication area with the operating system.

FIG. 1C illustrates an embodiment for the allocation of a memory space to a thread to be used as a communication area with the operating system. The memory space is allocated in user memory space 109 and is communicated to the operating system which records the address for the memory space 109 and uses it to send information to the thread. In one example embodiment, the memory space is allocated by the thread. However, embodiments are not so limited. For example, the memory space could be allocated by the operating system before the thread is launched or in other embodiments a linker and/or compiler could allocate the memory space in a development environment rather than allocating the memory space in the run time environment.

As shown in the embodiment of FIG. 1C, user memory space 109 will hold three numbers, including a context switch count 124, an offset 128, and a scale factor 126, received from the operating system. As one of ordinary skill in the art will appreciate upon reading this disclosure, the size of the memory space will be dependent on the register size of the device or system and can be reasonably sized as a factor of the device or system's clock rate, e.g., suited to a particular processor size. For example, a context switch counter may be a 32-bit counter in which case the context switch count 124 would include a 32-bit register. As will be discussed in more detail in connection with FIG. 2, once the memory space 109 has been set aside the thread will communicate the location (i.e., address) of this memory space 109 to the operating system, perhaps via a system call. All three numbers are readable by the thread and writable by the operating system. Thus, program embodiments execute instructions to save a context switch count 124, an offset 128, and a scale factor 126, received from the operating system, in the memory space 109.

Figure 1D:
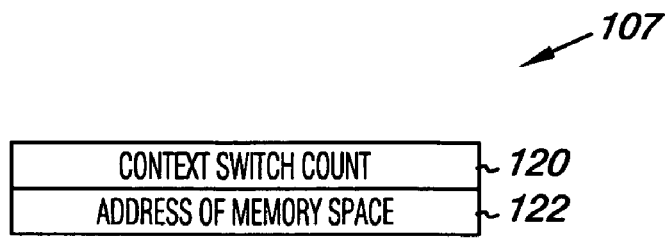
FIG. 1D is a block diagram illustration for an embodiment of a per-thread state as may be stored in a operating system memory.

FIG. 1D illustrates an embodiment of a per-thread state as may be stored in a operating system memory 107. As shown in the embodiment of FIG. 1D, the per-thread state in operating system memory 107 includes a context switch count 120 for a particular thread and the memory address 122 of the thread's allocated memory space 109, e.g., communication area. One of ordinary skill in the art will appreciate the manner in which a memory address 122 can be communicated to operating system memory 107. Further, as one of ordinary skill in the art will appreciate upon reading this disclosure a given process keeps track of context switches and for each thread a context switch count 120 can be maintained as per-thread data in the operating system 107, e.g., as part of per-thread state information in kernel memory.

Figure 2:
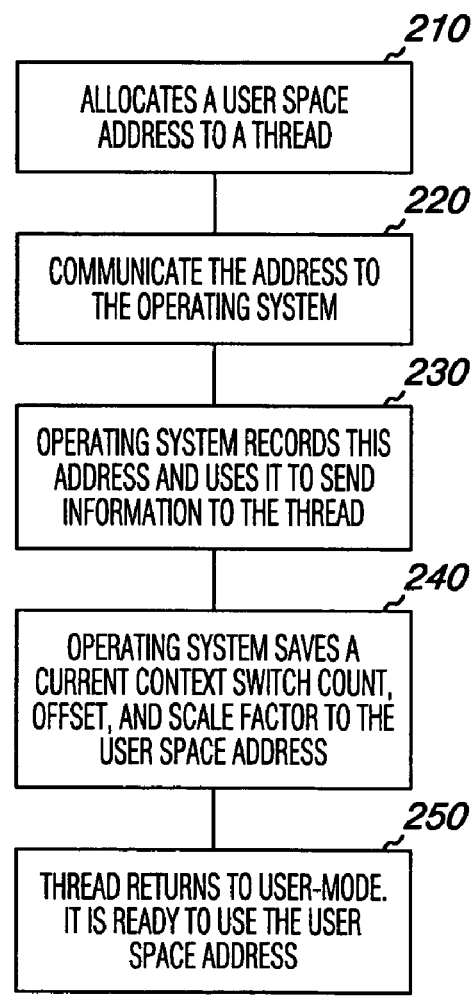
FIGS. 2-4 illustrate various method embodiments for use in calculating time in a computing device.
Figure 3:
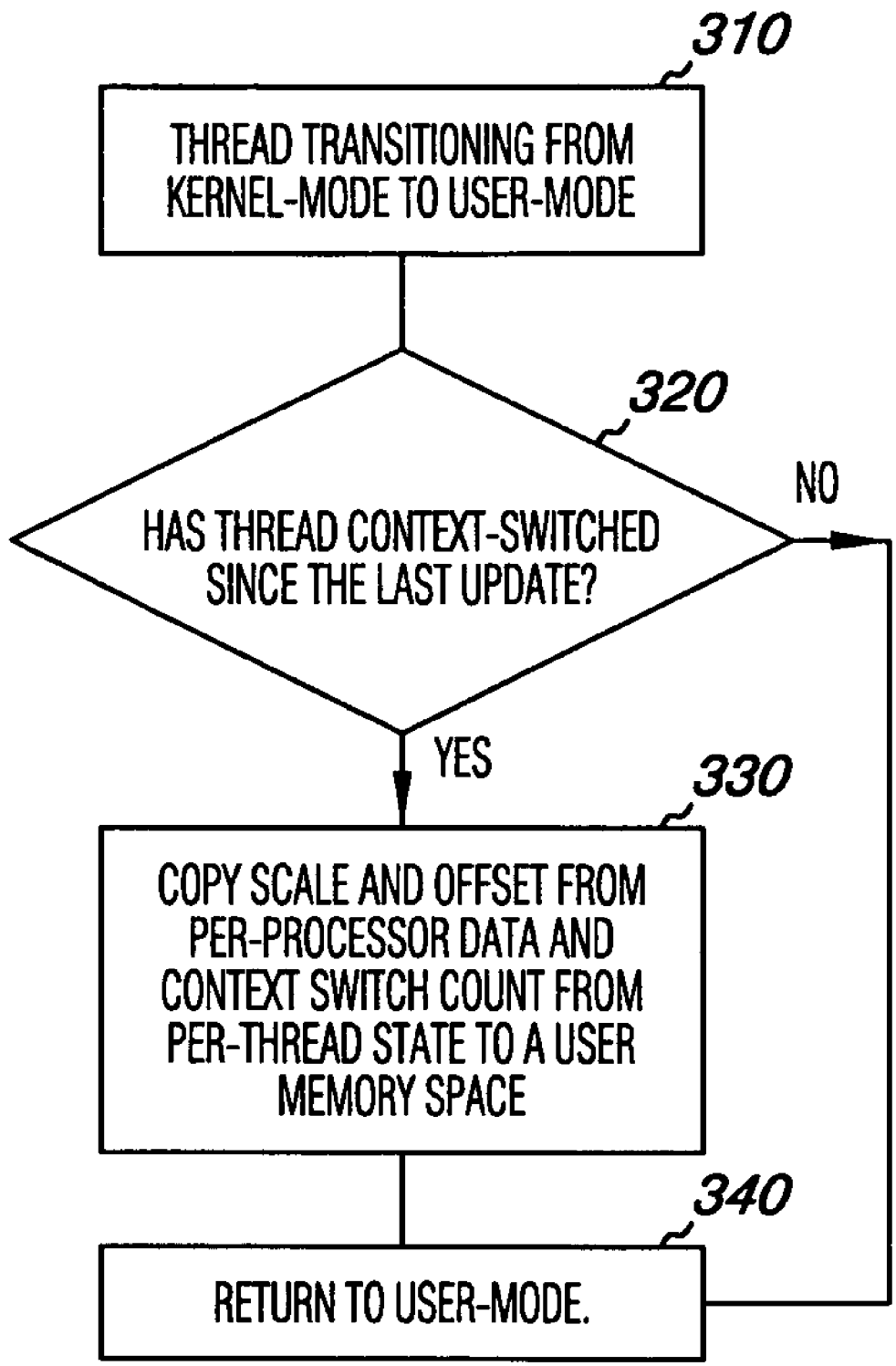
Figure 4:
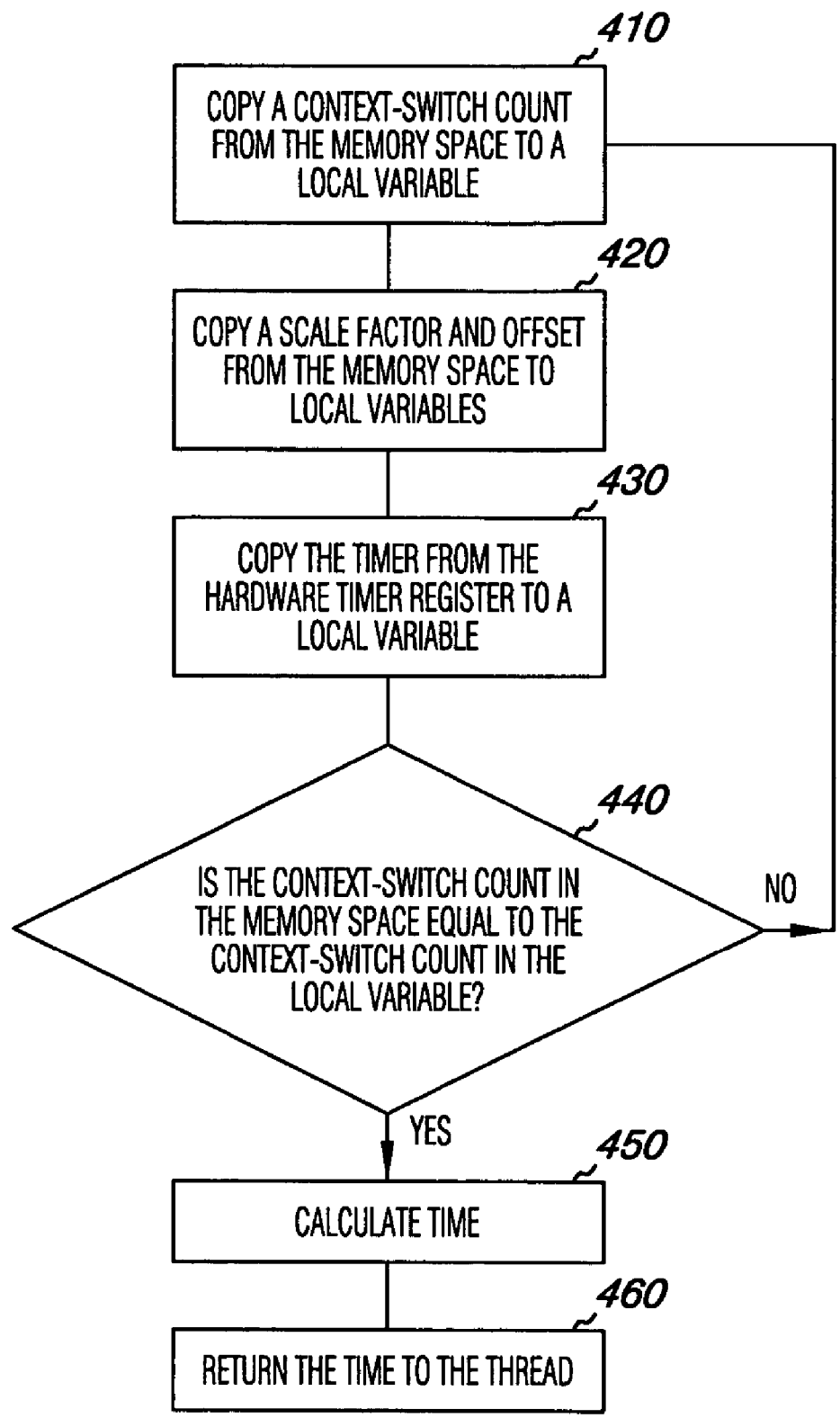

FIGS. 2-4 illustrate various method embodiments for use in calculating time in a computing device. As one of ordinary skill in the art will appreciate upon reading this disclosure, the various operational embodiments can be performed in two parts including: actions performed by the operating system; and actions performed by the thread. The embodiments can be performed by program instructions (e.g., computer executable instructions) operable on the devices/systems shown herein or otherwise. The embodiments of the invention, however, are not limited to any particular operating environment or to executable instructions written in a particular programming language. Program instructions, suitable for carrying out embodiments of the present invention, can be resident in one or several locations, including memory 106 and storage disks 108, which are examples of computer-readable media.

Unless explicitly stated, the method embodiments described herein are not constrained to a particular order or sequence. Additionally, some of the described method embodiments or elements thereof can occur or be performed at the same point in time.

FIG. 2 is a flow chart illustrating an initialization embodiment which can be performed once for each thread that may request time. As shown in the embodiment of FIG. 2, at block 210 program embodiments execute instructions in association with a thread to allocate memory local to the thread, i.e., in user memory space. This occurs while the thread is running in user-mode. One of ordinary skill in the art will appreciate the manner in which a process and each of its associated threads can request and be allocated memory space with a particular memory address, e.g., virtual memory address, assigned to the same.

As shown at block 220, program instructions execute to communicate, i.e., pass, the address of the allocated user memory space to the operating system. As illustrated in block 230, the operating system records this address, e.g., shown as 122 in operating system memory 107 of FIG. 1D, and uses it to send information to the thread. In other words, the operating system now knows this is the address of the memory space, e.g., communication area, for this particular thread.

As shown at block 240 in the embodiment of FIG. 2, the operating system can execute program instructions, e.g., in kernel-mode, to save a current context switch count, offset, and scale factor (shown as 124, 128 and 126 in FIG. 1C) to the thread's memory space (109 in FIG. 1C). That is, the operating system can execute program instructions to fill the communication area 109 with information for the first time and can ensure that the communication area 109 is initialized when the thread accesses it. As shown in block 250, the thread then returns to user-mode and is ready to use the user space address, e.g., communication area 109.

FIG. 3 is a flow chart illustrating an embodiment for updates to a memory space, e.g., communication area, allocated to a particular thread. As illustrated in FIG. 3, the operating system is responsible for keeping the three numbers described above up to date. Since these numbers will only change for any given thread when a context switch occurs, e.g., when a thread is switched on and off of a processor and/or from one processor to another, the operating system will have to update these numbers relatively infrequently. As such, the burden on the operating system is low and will not materially lower performance.

The embodiment of FIG. 3 illustrates in block 310 that a thread is transitioning from kernel-mode to user-mode, e.g., returning from a system call or trap. As shown in block 320, program instructions execute to query whether this thread has context switched since the last update to the thread's allocated memory space (109 in FIG. 1D). If the thread has not context switched then the thread returns to user-mode as illustrated at block 330 of FIG. 3.

As shown in block 340, however, the thread has context switched then program embodiments execute instructions to copy, e.g., update save, a current scale factor and offset from per-processor data (e.g., as shown in FIG. 1B) to user memory space (shown as 126 and 128 in FIG. 1C). The program embodiments additionally execute instructions to copy a current context switch count associated with a particular thread from per-thread state data (e.g., shown as 120 in operating system memory FIG. 1D) to user memory space (shown as 124 in FIG. 1C).

FIG. 4 is a flow chart illustrating an embodiment for a thread requesting time. As noted above, this is done many times with running application programs. As illustrated in block 410 in the embodiment of FIG. 4, program embodiments execute to copy a context switch count from a memory space allocated to a thread (as shown in FIG. 1C) to a local variable. One of ordinary skill in the art will appreciate that a variable is a structure that holds data and can be uniquely named by a programmer. A variable holds the data assigned to it until a new value is assigned or the program is finished. A local variable is one that is referenced within the subprogram, function (i.e., self-contained routine), or process it was defined in.

As shown in block 420, program embodiments execute to copy a scale factor and an offset from the memory space to local variables. In the embodiment of FIG. 4, program embodiments execute to copy a timer, e.g., a count from an associated processor's counter such as a hardware timer register, to another local variable as shown in block 430.

At block 440, in the embodiment of FIG. 4, program instructions execute to compare the context switch count contained in the thread's memory space to the context switch count copied to the local variable. If the context switch counts do not match, the thread knows it may have undergone a context switch while the above actions were occurring, e.g., the thread may have switched on and off of a processor and/or from one processor to another. As noted above, when this occurs while a thread is gathering time information it is possible that the scale factor and offset being used by the thread will be inappropriate for the processor counter value used and/or the processor counter value may not be current. Accordingly, as shown in FIG. 4, program instructions execute to repeat the above described actions, e.g., returns to block 410, until the context switch comparison results in a match.

In the embodiment of FIG. 4, if the context switch counts in the above comparison do match then instructions execute to calculate time as shown in block 450. For example, the program instructions can execute to cause a subroutine to calculate time according to a suitable formula such as has been described above, e.g., Wall_time=(scale_factor*hardware_counter)+offset. As shown in block 460, the subroutine can execute instructions to return the calculated time to the thread.

In various embodiments, instructions execute to cause time to be calculated using only the values for the processor counter, the offset, and the scale factor, that have been copied to the local variables. Embodiments, however, are not so limited to use of the values in the local variables or to the example order for comparing the context switch counts. For example, if the thread first saves a context switch count in a local variable and then uses the processor's counter, scale factor, and offset to calculate time, it could execute instructions, according to various program embodiments, to then compare the context switch counts and repeat the actions if a match were not found. In other words, if after computing time, the values of the context switch counts in the memory space and copied to the local variable are the same then the thread knows that a context switch likely did not occur during the process. Accordingly, the memory values used, e.g., count from an associated processor's counter, the offset, and the scale factor, were atomic and the resulting calculation valid.

Thus, program embodiments can execute instructions in association with a thread to use three numbers (i.e., values), these being a context switch count, an offset, and scale factor, in conjunction with a counter whenever the thread want to calculate time. And, according to the embodiments described herein, the operation does not require a system call or separate entry into the system, i.e., kernel, by the thread when it wants to do so. System performance can be maintained using the described embodiments because the memory and registers used are in user-space and do not involve special hardware or changes within software developers application programs. The embodiments described herein provide confidence in time measurement calculations without the use of a global, synchronized system clock and without using extra system calls.

In practice, the time passing between the context switch checks described herein is much smaller than the time between actual context switches. As a result, the operational embodiments described herein are frequently successful on a first attempt, but if not a second attempt is quick and does not pose a limitation to system performance.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for use in calculating time in a computing device, comprising:

allocating, by program instructions executing in the computing device, a memory space to a thread executing on a first processor, wherein the memory space is to be used to communicate with an operating system;

saving a context switch count, an offset, and a scale factor, received from the operating system, in the memory space that is part of a memory, wherein the context switch count is a count of context switches of the thread, and wherein the offset and scale factor are for use along with a counter of the first processor to calculate the time, wherein the scale factor is used to scale a count of the counter, and the offset is added to account for when the counter started;

copying the context switch count, the offset, and the scale factor to local variables associated with the thread;

the thread performing context switching from the first processor to a second processor after copying the context switch count, the offset, and the scale factor to the local variables;

comparing the context switch count saved in the memory space to the context switch count copied to a corresponding one of the local variables, wherein the context switch count saved in the memory space not being equal to the context switch count copied to the one local variable is an indication of the context switching from the first processor to the second processor; and in response to determining that the context switch count saved in the memory space is not equal to the context switch count copied to the one local variable, re-calculating the time using an offset, a scale factor, and a counter of the second processor.

2. The method of claim 1, wherein allocating the memory space includes allocating a user memory space.

3. The method of claim 1, further comprising using the operating system to update the context switch count, the offset, and the scale factor in the memory space in response to the context switching by the thread.

4. A method for use in calculating time in a computing device, comprising:

copying a context switch count, representing a thread state associated with a thread that is executing on a particular one of plural processors, from a memory space in user space to a local variable associated with the thread;

using a counter, a scale factor, and an offset associated with the particular processor to calculate the time, wherein the scale factor is used to scale a count of the counter, and the offset is added to account for when the counter started;

comparing the context switch count copied to the local variable to the context switch count in the memory space, wherein the context switch count copied to the local variable not being equal to the context switch count in the memory space is an indication that the thread has context switched from the particular processor to a second one of the plural processors after copying of the context switch count to the local variable; and in response to determining that the context switch count copied to the local variable is not equal to the context switch count in the memory space, re-calculating the time using a counter, scale factor, and offset associated with the second one of the plural processors.

5. The method of claim 4, further comprising updating the context switch count, the offset, and the scale factor in the memory space when the thread has context switched.

6. The method of claim 5, further comprising, when the context switch count in the local variable does not equal the context switch count in the memory space, using the updated offset and scale factor to re-calculate the time.

7. The method of claim 4, further comprising checking for a change in the context switch count in the memory space when the thread is transitioning from kernel mode to user mode.

8. A computer readable medium having a program executable on one or more processors to cause a device to perform a method, comprising:

allocating a memory space to a thread to be used to communicate with an operating system; and receiving from the operating system and saving to the memory space a context switch count associated with a thread state, and an offset and a scale factor associated with a first processor, wherein the context switch count is a count of context switches of the thread, and wherein the offset and scale factor are for use along with a counter of the first processor to calculate the time, wherein the scale factor is used to scale a count of the counter, and the offset is added to account for when the counter started;

copying the context switch count, the offset, and the scale factor to local variables associated with the thread;

context switching the thread from the first processor to a second processor after copying the context switch count, the offset, and the scale factor to the local variables;

comparing the context switch count saved in the memory space to the context switch count copied to a corresponding one of the local variables, wherein the context switch count saved in the memory space not being equal to the context switch count copied to the one local variable is an indication of the context switching from the first processor to the second processor; and in response to determining that the context switch count saved in the memory space is not equal to the context switch count copied to the one local variable, re-calculating the time using an offset, a scale factor, and a counter of the second processor.

9. The medium of claim 8, wherein the counter of the first processor is a hardware timer register of the first processor.

10. The medium of claim 8, the method further comprising checking the context switch count in the memory space when the thread is transitioning from kernel mode to user mode.

11. The medium of claim 10, the method further comprising updating the context switch count, the offset, and the scale factor in the memory space in response to context switching of the thread.

12. A computing device, comprising:

a number of processors, each processor having a hardware timer register associated therewith;

a thread initially executable on a first one of the number of processors;

a user memory in communication with the number of processors, wherein the thread is allocated a memory space in the user memory, the memory space having a context switch count, a scale factor, and an offset stored therein associated with the first processor, wherein the context switch count is a count of context switches of the thread, wherein the offset and scale factor are for use along with the hardware timer register to calculate a time, wherein the scale factor is to scale a count of the hardware timer register, and the offset is added to account for when the hardware timer register started;

program instructions executable on at least one of the number of processors to:

copy the context switch count, the scale factor and the offset from the thread's memory space to local variables;

compare the context switch count in the memory space to the context switch count copied to one of the local variables, wherein the context switch count in the memory space not being equal to the context switch count copied to the one local variable is an indication of context switching of the thread from the first processor to a second of the number of processors;

in response to determining that the context switch count in the memory space is equal to the context switch count copied to the one local variable, calculate the time using the scale factor, the offset, and the hardware timer register of the first processor; and in response to determining that the context switch count in the memory space is not equal to the context switch count copied to the one local variable, re-calculate the time using a scale factor, an offset, and a hardware timer register for the second processor.

13. A multiprocessor system, comprising:

a number of processors, each processor having a counter associated therewith;

a memory in communication with the number of processors; and program instructions that upon execution by at least one of the number of processors cause the system to:

copy a context switch count, representing a thread state associated with a thread that is executing on a first one of the number of processors, from a memory space in the memory to a local variable associated with the thread;

compare the context switch count copied to the local variable to the context switch count in the memory space, wherein the context switch count copied to the local variable not being equal to the context switch count in the memory space is an indication that the thread has context switched from the first processor to a second of the number of processors after copying of the context switch count to the local variable; and in response to determining that the context switch count copied to the local variable is equal to the context switch count in the memory space, use the counter, a scale factor, and an offset associated with the first processor to calculate a time, wherein the scale factor is to scale a count of the counter, and the offset is added to account for when the counter started;

in response to determining that the context switch count copied to the local variable is not equal to the context switch count in the memory space, re-calculate the time using the counter, a scale factor, and an offset associated with the second processor.

14. The system of claim 13, wherein the counter associated with each of the first and second processors the particular processor is a hardware counter.

15. The system of claim 13, wherein the program instructions are executable to further:

check if the thread has context switched; and update the context switch count, the offset, and the scale factor in the memory space when the thread has context switched.

* * * * *

UNITED STATES PATENT AND TRADEMARK OFFICE
CERTIFICATE OF CORRECTION

PATENT NO. : 7,681,199 B2 Page 1 of 1
APPLICATION NO. : 10/931107
DATED : March 16, 2010
INVENTOR(S) : Paul D. Gootherts et al.

It is certified that error appears in the above-identified patent and that said Letters Patent is hereby corrected as shown below:

On the Title Pg, Item (75), Inventors, in column 1, line 1, delete "Paul Gootherts" and insert -- Paul D. Gootherts --, therefor.

Signed and Sealed this

Twenty-seventh Day of July, 2010

David J. Kappos
*Director of the United States Patent and Trademark Office*